US012669824B2

(12) United States Patent
Gu et al.

(10) Patent No.: US 12,669,824 B2
(45) Date of Patent: Jun. 30, 2026

(54) STORAGE MEDIUM, ROBOT, AND METHOD FOR GENERATING NAVIGATION MAP

(71) Applicant: UBTECH ROBOTICS CORP LTD, Shenzhen (CN)

(72) Inventors: Yulong Gu, Shenzhen (CN); Simin Zhang, Shenzhen (CN); Yun Zhao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 221 days.

(21) Appl. No.: 18/211,531

(22) Filed: Sep. 8, 2023

(65) Prior Publication Data

US 2024/0004400 A1 Jan. 4, 2024

Related U.S. Application Data

(63) Continuation of application No. PCT/CN2021/130783, filed on Nov. 16, 2021.

(30) Foreign Application Priority Data

Dec. 24, 2020 (CN) .......................... 202011551363.6

(51) Int. Cl.
| | |
|---|---|
| *G05D 1/00* | (2024.01) |
| *G01C 21/00* | (2006.01) |
| *G01C 21/32* | (2006.01) |

(52) U.S. Cl.
CPC .......... *G05D 1/0274* (2013.01); *G01C 21/32* (2013.01); *G01C 21/383* (2020.08); *G05D 1/0248* (2013.01); *G05D 1/0272* (2013.01)

(58) Field of Classification Search
CPC .. G05D 1/0274; G05D 1/0248; G05D 1/0272; G05D 1/242; G05D 1/245;

(Continued)

(56) References Cited

U.S. PATENT DOCUMENTS

| | | | |
|---|---|---|---|
| 2013/0242284 A1* | 9/2013 | Zeng ..................... | G01S 17/931 |
| | | | 356/4.01 |
| 2018/0075643 A1* | 3/2018 | Sequeira ................ | G06T 7/579 |

(Continued)

FOREIGN PATENT DOCUMENTS

| | | |
|---|---|---|
| CN | 107966989 A | 4/2018 |
| CN | 111220992 A | 6/2020 |

OTHER PUBLICATIONS

Jiao, Jianhao, et al. "Robust Odometry and Mapping for Multi-LiDAR Systems with Online Extrinsic Calibration." arXiv preprint arXiv:2010.14294 (2020). (Year: 2020).*

(Continued)

*Primary Examiner* — Faris S Almatrahi
*Assistant Examiner* — Dana F Artimez

(57) ABSTRACT

A storage medium, a robot, and a method for generating navigation map are provided. By disposing a first lidar and a second lidar located higher than the first lidar, it constructs a first map corresponding to the first lidar based on first laser data collected by the first lidar, and calculate second positioning data corresponding to the second lidar during constructing the first map, constructs a second map corresponding to the second lidar based on the second positioning data and second laser data collected by the second lidar, and obtains a navigation map corresponding to the robot by fusing the first map with the second map, such that the fused map includes not only positioning information provided by the first map, but also obstacle information provided by the first map and the second map.

9 Claims, 5 Drawing Sheets

(58) Field of Classification Search
CPC ............. G05D 1/2462; G05D 2109/10; G05D
2111/17; G01C 21/383; G01C 21/32
See application file for complete search history.

(56) References Cited

U.S. PATENT DOCUMENTS

| | | | |
|---|---|---|---|
| 2018/0313956 A1* | 11/2018 | Rzeszutek ............... | G01S 17/42 |
| 2019/0219697 A1* | 7/2019 | Castorena Martinez .................... | |
| | | | G01S 17/86 |
| 2021/0187733 A1* | 6/2021 | Lee ........................ | G06N 20/00 |

OTHER PUBLICATIONS

ISR for PCT/CN2021/130783.
Written opinions of ISA for PCT/CN2021/130783.

\* cited by examiner

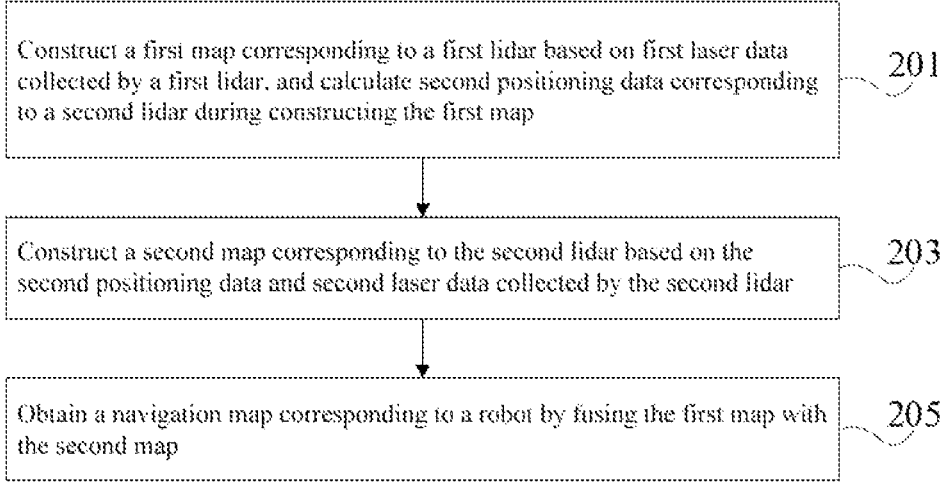

Construct a first map corresponding to a first lidar based on first laser data collected by a first lidar, and calculate second positioning data corresponding to a second lidar during constructing the first map — 201

Construct a second map corresponding to the second lidar based on the second positioning data and second laser data collected by the second lidar — 203

Obtain a navigation map corresponding to a robot by fusing the first map with the second map — 205

FIG. 2

STORAGE MEDIUM, ROBOT, AND METHOD FOR GENERATING NAVIGATION MAP

CROSS REFERENCE TO RELATED APPLICATIONS

The present disclosure is a continuation-application of International Application PCT/CN2021/130783, with an international filing date of May 31, 2023, which claims foreign priority of Chinese Patent Application No. 2020115513636, filed on Dec. 24, 2020 in the State Intellectual Property Office of China, the contents of all of which are hereby incorporated by reference.

BACKGROUND

1. Technical Field

The present disclosure relates to robot technology, and particularly to a storage medium, a robot, and a method for generating navigation map.

2. Description of Related Art

Laser SLAM (simultaneous localization and mapping) technology enables robots to use lidar data to create laser navigation maps, so as to realize real-time positioning and navigation planning for the robots.

However, in some application scenarios of a robot, because the environment where the robot moves is tended to change, the position information of obstacles in the space of the environment will change rapidly, which will cause low positioning accuracy of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

FIG. 2 is a flow chart of a navigation map generation method according to an embodiment of the present disclosure.

DETAILED DESCRIPTION

Figure 1:
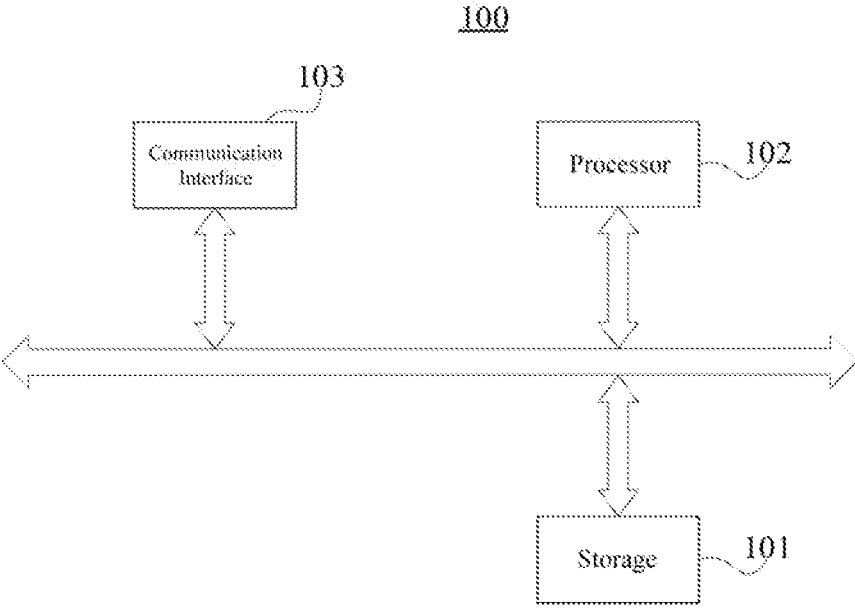
FIG. 1 is a schematic block diagram of the structure of a robot according to an embodiment of the present disclosure.

In order to make the objects, technical solutions and advantages of the present disclosure more clear, the technical solutions in the present disclosure will be clearly and completely described below with reference to the drawings in the embodiments of the present disclosure. Apparently, the described embodiments are part of the embodiments of the present disclosure, not all of the embodiments. The components of the present disclosure that are described and illustrated in the drawings herein may generally be arranged and designed in a variety of different configurations.

Therefore, the following detailed description of the embodiments of the present disclosure provided in the drawings is not intended to limit the scope of the present disclosure, but merely represent some of the selected embodiments of the present disclosure. Based on a part of the embodiments in the present disclosure, all other embodiments obtained by those of ordinary skill in the art without creative work fall within the protection scope of the present disclosure.

It should be noted that, in the following figures, similar numerals and letters refer to similar items. Therefore, once an item is defined in one figure, it does not require further definition and explanation in subsequent figures. Simultaneously, in the description of the present disclosure, the terms "first", "second", and the like in the descriptions are only used for distinguishing, and cannot be understood as indicating or implying relative importance.

It should be noted that in the present disclosure, relational terms such as "first" and "second" are used only to distinguish one entity or operation from another entity or operation, and do not necessarily require or imply the existence of any actual relationship or sequence between these entities or operations. Moreover, the terms "comprising", "including" or any other variation thereof are intended to encompass non-exclusive inclusion such that a process, method, article or apparatus (device) comprising a series of elements includes not only those elements, but also includes other elements not explicitly listed or inherent to the process, method, article or apparatus. Without further limitation, an element limited by the sentence "comprising a . . . " does not preclude the existence of additional identical elements in a process, method, article or apparatus that includes the element.

For example, in the above-mentioned scenario where the robot is navigated using SLAM technology, a lidar may be disposed at a lower portion of the robot, and the data collected by the lidar may be used to create a navigation map, and then the created navigation map may be used for real-time positioning and navigation.

For example, in some embodiments, the robot may adopt a key frame matching based scheme which uses each frame of lidar data collected by the lidar for mapping by establishing a constraint relationship between the lidar data corresponding to the key frames. This mapping scheme can better realize loop closure detection and optimization, and can also be applied in mapping scenarios such as large-area environments.

In which, in scenes such as offices, libraries, nursing homes, and hospital wards, there are generally more movable objects such as tables, chairs, and hospital beds. When these movable objects are moved in the environment where the robot moves, it may cause large changes in the environment, for example, low positioning accuracy of the robot will be caused by the changes of the position of the obstacles (i.e., the movable objects) in the environment where the robot moves.

Therefore, in order to solve at least some of the defects in the above-mentioned related technologies, in some embodiments of the present disclosure, by disposing a first lidar at a side of a robot away from a ground and a second lidar at another side of the robot close to the ground, it constructs a first map corresponding to the first lidar based on first laser data collected by the first lidar, and calculate second positioning data corresponding to the second lidar during constructing the first map, constructs a second map corresponding to the second lidar based on the second positioning data and second laser data collected by the second lidar, and obtains a navigation map corresponding to the robot by fusing the first map with the second map, such that the fused map includes not only positioning information provided by the first map, but also obstacle information provided by the first map and the second map. In such manner, the robot can be positioned accurately, thereby improving the positioning accuracy of the robot.

Some embodiments of the present disclosure will be described in detail below with reference to the drawings. The following embodiments and the features therein may be combined with each other while there is no confliction therebetween.

FIG. 1 is a schematic block diagram of the structure of a robot according to an embodiment of the present disclosure. As shown in FIG. 1, in some embodiments, a robot 100 may include a storage 101, a processor 102, and a communication interface 103. The storage 101, the processor 102, and the communication interface 103 are directly/indirectly electrically coupled to each other so as to realize data transmission or interaction. For example, these components may be electrically connected to each other through one or more communication buses or signal lines.

The storage 101 may be used to store software programs and modules such as the program instructions/modules corresponding to a navigation map generation apparatus (see FIG. 4) provided in the present disclosure. The processor 102 executes various functional applications and data processing by executing the software programs/modules stored in the storage 101 so as to execute the steps of a navigation map generation method (see FIG. 2) provided in the present disclosure. The communication interface 103 may be configured to perform signaling or data communication with other node devices.

In which, the storage 101 may be, but not limited to, a random access memory (RAM), a read only memory (ROM), a programmable read only memory (PROM), erasable programmable read-Only memory (EPROM), electrical erasable programmable read-only memory (EEPROM), or the like.

The processor 102 may be an integrated circuit chip with signal processing capability. The processor 102 may be a general purpose processor including a central processing unit (CPU), network processor (NP), or the like, and may also be a digital signal processor (DSP), an application specific integrated circuit (ASIC), a field-programmable gate array (FPGA) or other programmable logic devices, discrete gate, transistor logic device, and discrete hardware component.

It can be understood that the composition of the robot 100 in FIG. 1 is only an example of that of a robot controller, and the robot 100 may further include more or less elements than those shown in FIG. 1, or have a different configuration from that shown in FIG. 1. Each of the elements shown in FIG. 1 may be implemented in hardware, software, or a combination thereof.

In some embodiments, the robot may further be provided with a first lidar and a second lidar. In which, the first lidar may be disposed at a side of the robot away from a ground, and the second lidar may be disposed at another side of the robot close to the ground. For example, if the robot is a humanoid robot, the first lidar may be disposed on the head of the humanoid robot, and the second lidar may be disposed on the lower portion of the humanoid robot.

The following will use the robot shown in FIG. 1 as an example of the subject to execute the navigation map generation method.

FIG. 2 is a flow chart of the navigation map generation method according to an embodiment of the present disclosure. In this embodiment, a navigation map generation method for the above-mentioned robot is provided. The navigation map generation method is a computer-implemented method executable for a processor of the above-mentioned robot. In other embodiments, the method may be implemented through the navigation map generating apparatus shown in FIG. 4. As shown in FIG. 2, the navigation map generation method may include the following steps.

201: constructing a first map corresponding to the first lidar based on first laser data collected by the first lidar, and calculating second positioning data corresponding to the second lidar during constructing the first map.

203: constructing a second map corresponding to the second lidar based on the second positioning data and second laser data collected by the second lidar.

205: obtaining a navigation map corresponding to the robot by fusing the first map with the second map.

Figure 3A:
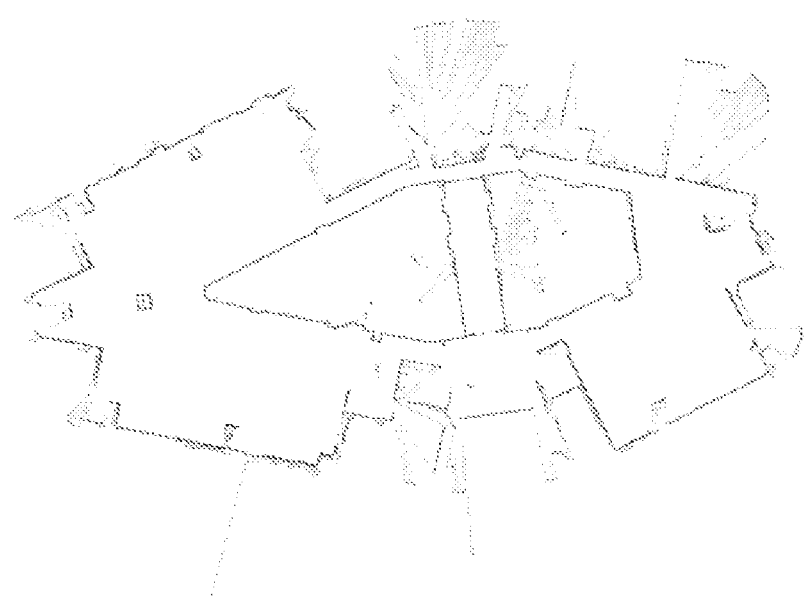
FIG. 3A is a schematic diagram of a first map according to an embodiment of the present disclosure.

FIG. 3A is a schematic diagram of the first map according to an embodiment of the present disclosure. As shown in FIG. 3A, in some embodiments, the first lidar may continuously collect first laser data to transmit to the robot, and the second lidar may also continuously collect second laser data to transmit to the robot. Based on this, the robot may use the above-mentioned key frame matching based scheme that uses the first laser data collected by the first lidar to create the first map corresponding to the first lidar.

In which, since the first lidar is disposed at the side of the robot away from the ground and the second lidar is disposed at the side of the robot close to the ground, the first lidar generally collects the laser data at a height higher than the second lidar, that is, the first lidar collects the laser data away from the ground while the second lidar collects the laser data close to the ground. For example, if the first lidar is disposed at a height of 1.5 meters of the robot above the ground while the second lidar is disposed at a height of 0.2 meters of the robot above the ground of the robot, in the above-mentioned scenes such as offices, libraries, nursing homes, and hospital wards, the height of the movable objects generally does not exceed 1.5 meters, the movable objects in the environment where the robot moves are generally positioned in the spatial area covered by the second lidar while the movable objects in the spatial area covered by the first lidar are generally less, hence the environment will be more stable. Therefore, the precision of the first map created by the robot using the received first laser data will be also higher.

In addition, during using the first laser data to construct the first map, the robot may also calculate the second positioning data corresponding to the second lidar. The second positioning data may be used to indicate position information when the second lidar collects the second laser data.

Furthermore, the robot may use the above-mentioned second positioning data as an initial pose (position and posture) of the second lidar when creating map to match and position each data frame in the second laser data based on the second positioning data and the second laser data collected by the second lidar using, for example, the above-mentioned key frame matching based scheme, thereby creating the second map corresponding to the second lidar.

Figure 3B:
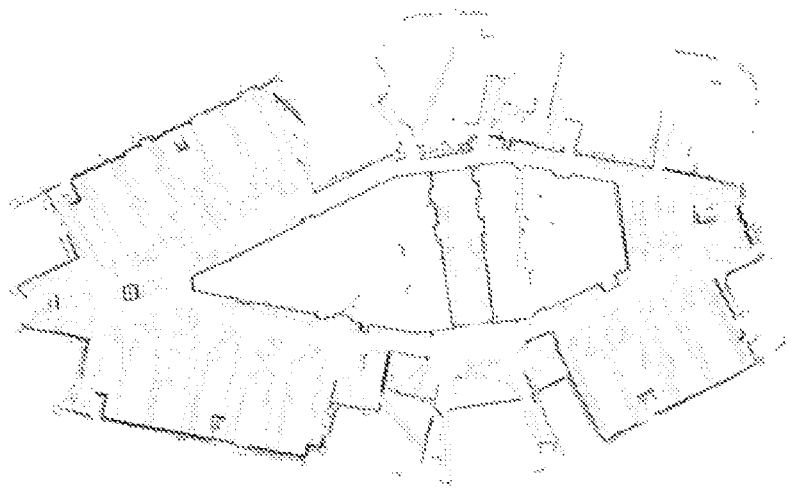
FIG. 3B is a schematic diagram of a navigation map according to an embodiment of the present disclosure.

FIG. 3B is a schematic diagram of the navigation map according to an embodiment of the present disclosure. As shown in FIG. 3A, still furthermore, after creating the first map and the second map through the above-mentioned steps, the robot may fuse the first map and the second map to obtain the navigation map corresponding to the robot. In which, the fused navigation map not only includes the positioning information provided by the first map, but also includes the obstacle information provided by the first map and the second map, so that the robot can be positioned accurately while the obstacles in the environment where the robot moves is identified accurately, thereby improving the positioning accuracy of the robot.

It should be noted that, in some embodiments, since the first lidar and the second lidar are not synchronized when collecting laser data, there is a time difference between the collected laser data of the first lidar and that of the second lidar. Therefore, in some embodiments, when the robot executes step 201 to calculate the second positioning data corresponding to the second lidar, it can use, for example, a Gauss-Newton matching algorithm to match the first positioning data corresponding to the first lidar at the moment when the second lidar collects the second laser data first during constructing the first map.

Then, the robot may take the moment when the first lidar collects the first laser data as the first moment and that when the second lidar collects the second laser data as the second moment, so as to obtain a movement distance of the robot from the first moment to the second moment, that is, the distance that the robot moves from the moment when the first lidar obtains the first frame of the first laser data to the moment when the second lidar obtains the first frame of the second laser data.

For example, in some embodiments, the robot may be provided with an odometer, and it may take the reading of the odometer when the first lidar collects the first laser data as a first odometer reading corresponding to the first lidar and the reading of the odometer when the second lidar collects the second laser data as a second odometer reading corresponding to the second lidar, thereby taking an odometer difference between the first odometer reading corresponding to the first lidar and the second odometer reading corresponding to the second lidar as the movement distance of the robot from the first moment to the second moment.

In some embodiments, it may provide only one odometer to the robot so as to determine the above-mentioned first odometer reading and second odometer reading through the readings of the odometer at different moments. In other embodiments, it may provide a first odometer for the first lidar and a second odometer for the second lidar, so that the first odometer can be used to collect the first odometer reading corresponding to the first lidar while the second odometer can be used to collect the second odometer reading corresponding to the second lidar.

Then, the robot may adjust the first positioning data using the calculated movement distance according to the obtained first positioning data and movement distance, so as to eliminate positioning errors caused by the inconsistencies of the initial positions of the first lidar and the second lidar when collecting laser data, thereby accurately generating the second positioning data corresponding to the second lidar, for example, generating the second positioning data by adding the movement distance to the first positioning data.

In addition, in some embodiments, in order to improve the creation accuracy of the second map, the robot may use the created second map to re-position the second lidar during creating the second map by executing step 203, that is, during creating the second map, the second positioning data of the second lidar is updated, then it continues to create the second map based on the updated second positioning data, and so on, thereby improving the precision of the created second map.

Furthermore, in some possible scenarios, since the first lidar is disposed at the side of the robot away from the ground, and the second lidar is disposed at the side of the robot close to the ground, the size of the areas that the first lidar and the second lidar can cover are different. For example, the area covered by the first lidar is generally larger than the that by the second lidar, and the size of the first map constructed using the first laser data is generally larger than that of the second map constructed using the second laser data.

Therefore, in some embodiments, in order to avoid anomalies in fusing maps that is caused by the inconsistent in the sizes of the first map and the second map, when the robot executes step 205, for a first pixel coordinate system constructed based on the first map and a second pixel coordinate system constructed based on the second map, a positional distance difference between the first pixel coordinate system and the second pixel coordinate system, that is, the translation amount of the two pixel coordinate systems in the horizontal direction may be obtained first. For example, the robot may obtain the above-mentioned positional distance difference by calculating the difference between the coordinates of the origins of the first pixel coordinate system and that of the second pixel coordinate system in a world coordinate system.

In which, in some embodiments, the robot may construct the first pixel coordinate system based on the first frame of the first laser data; similarly, the robot may construct the second pixel coordinate system based on the first frame of the second laser data.

Then, the robot may translate the second map based on the positional distance difference, so as to merge the first map and the second map after aligning the two, thereby generating the navigation map corresponding to the robot that is shown in FIG. 3B.

Figure 4:
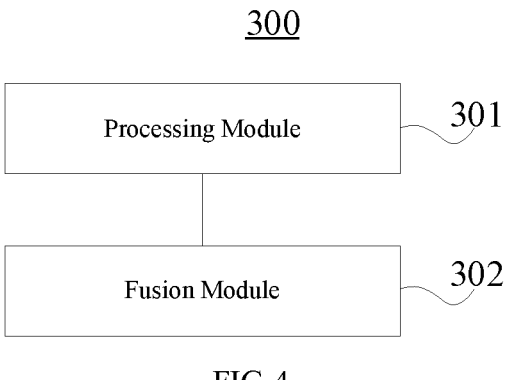
FIG. 4 is a schematic block diagram of the structure of a navigation map generating apparatus according to an embodiment of the present disclosure.

FIG. 4 is a schematic block diagram of the structure of a navigation map generating apparatus 300 according to an embodiment of the present disclosure. As shown in FIG. 4, the navigation map generation apparatus 300 is provided based on the same idea as the above-mentioned robot navigation map generation method. In some embodiments, the navigation map generation apparatus 300 may include a processing module 301 and a fusion module 302.

The processing module 301 may be configured to construct a first map corresponding to the first lidar based on first laser data collected by the first lidar, and calculate second positioning data corresponding to the second lidar during constructing the first map.

The processing module 301 may be further configured to construct a second map corresponding to the second lidar based on the second positioning data and second laser data collected by the second lidar.

The fusion module 302 may be configured to obtain a navigation map corresponding to the robot by fusing the first map with the second map.

In some embodiments, the processing module 301 may be configured to calculate the second positioning data corresponding to the second lidar during constructing the first map by:

matching, during constructing the first map, the first positioning data corresponding to the first lidar when the second lidar collects the second laser data;

obtaining a movement distance of the robot from a first moment to a second moment, wherein the first moment is a moment when the first lidar collects the first laser data, and the second moment is another moment when the second lidar collects the second laser data; and generating the second positioning data corresponding to the second lidar based on the first positioning data and the movement distance.

In some embodiments, the processing module 301 may be configured to obtain the movement distance of the robot from the first moment to the second moment by:

using an odometer difference between a first odometer reading corresponding to the first lidar and a second odometer reading corresponding to the second lidar as a movement distance of the robot from the first moment to the second moment, wherein the first odometer reading is a reading of an odometer of the robot when the first lidar collects the first laser data, and the second odometer reading is another reading of the odometer when the second lidar collects the second laser data.

In some embodiments, the fusion module 302 may be configured to obtain the navigation map corresponding to the robot by fusing the first map with the second map by:

obtaining a positional distance difference between a first pixel coordinate system and a second pixel coordinate system, wherein the first pixel coordinate system is a pixel coordinate system constructed based on the first map, and the second pixel coordinate system is another pixel coordinate system constructed based on the second map, and generating the navigation map corresponding to the robot by combining the first map and the second map based on the positional distance difference.

In the embodiments of the present disclosure, it should be understood that the disclosed apparatus (device) and method may be implemented in other manners. The above-mentioned apparatus embodiment is merely illustrative, for example, the flow charts and block diagrams in the drawings show the architecture, functions and operations that are possible to be implemented by the apparatus, method and computer program products of some embodiments. In this regard, each block in the flowchart or block diagram may represent a module, a program segment, or a part of codes that include one or more computer executable instructions for implementing specified logical functions.

It should also be noted that, in some alternative implementations, the functions noted in the blocks may occur out of the order noted in the figures. For example, two blocks in succession may, in fact, be executed substantially concurrently, or may sometimes be executed in the reverse order, depending upon the functionality involved.

It is also to be noted that each block in the block diagrams and/or flow charts, and the combination of blocks in the block diagrams and/or flow charts, may be implemented by a dedicated hardware-based system for performing the specified function or action, or may be implemented by a combination of special purpose hardware and computer instructions.

In addition, each functional module in some embodiments of the present disclosure may be integrated to form an independent part, each module or unit may exist independently, or two or more modules or units may be integrated to form an independent part.

The functions can be stored in a computer readable storage medium if it is implemented in the form of a software functional unit and sold or utilized as a separate product. Based on this understanding, the technical solution of the present disclosure, either essentially or in part, contributes to the prior art, or a part of the technical solution can be embodied in the form of a software product. The software product is stored in a storage medium, which includes a number of instructions for enabling a computer device (which can be a personal computer, a server, a network device, etc.) to execute all or a part of the steps of the methods described in some of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing are only some embodiments of the present disclosure, and are not intended to limit thereto. For those skilled in the art, the present disclosure may have various modifications and variations. Any modifications, equivalent replacements, improvements, and the like made within the spirit and principles of the present disclosure should be included within the scope of the present disclosure.

For those skilled in the art, it will be apparent that the present disclosure is not limited to the details of the above-mentioned exemplary embodiments, and the present disclosure can be implemented in other forms without departing from the spirit or essential characteristics of the present disclosure. Therefore, the embodiments should be regarded as exemplary and not restrictive in all points of view. The scope of the present disclosure is defined by the appended claims rather than the foregoing description, and all changes that come within the meaning and range of the equivalent requirements of the claims are included in the present disclosure. Any reference sign in a claim should not be construed as limiting that claim.

What is claimed is:

1. A computer-implemented navigation grid map generation method, comprising:

providing a robot comprising a first lidar, a second lidar, an odometer, and a processor electrically coupled to the first lidar, the second lidar and the odometer, wherein the first lidar is disposed at a first position of the robot, the second lidar is disposed at a second position of the robot, the first position is higher than the second position, and a number of movable objects in a spatial area covered by the second lidar is greater than a number of the movable objects in a spatial area covered by the first lidar;

controlling, by the processor, the robot to move, collecting, by the first lidar, first laser data at a first moment, constructing, by the processor, a first grid map corresponding to the first lidar based on the first laser data, and obtaining, by the processor, first positioning data using a Gauss-Newton matching algorithm based on the first laser data, wherein the first positioning data is configured to indicate position information of the first lidar at the first moment;

collecting, by the second lidar, second laser data at a second moment, wherein the second moment is later than the first moment;

obtaining, by the processor, a movement distance of the robot from the first moment to the second moment using the odometer, generating second positioning data based on the first positioning data and the movement distance, and constructing a second grid map corresponding to the second lidar based on the second positioning data and the second laser data, wherein second positioning data is configured to indicate position information of the second lidar at the second moment;

obtaining, by the processor, a navigation grid map corresponding to the robot by fusing the first grid map with the second grid map; and navigating, by the processor, the robot according to the navigation grid map;

wherein the robot has a first odometer corresponding to the first lidar and a second odometer corresponding to the second lidar, and the step of obtaining, by the processor, the movement distance of the robot from the first moment to the second moment using the odometer comprises:

obtaining, by the processor, a first odometer reading of the first odometer at the first moment, and a second odometer reading of the second odometer at the second moment; and calculating, by the processor, a difference between the first odometer reading and the second odometer reading, and using the difference as the movement distance;

wherein the navigation grid map comprises: positioning information provided by the first grid map, and obstacle information provided by the first grid map and the second grid map;

wherein the spatial area covered by the first lidar is larger than the spatial area covered by the second lidar, a size of the first grid map is larger than a size of the second grid map, and the step of obtaining, by the processor, the navigation grid map corresponding to the robot by fusing the first grid map with the second grid map comprises:

constructing, by the processor, a first pixel coordinate system based on a first frame of the first laser data, and constructing a second pixel coordinate system based on a first frame of the second laser data;

obtaining a positional distance difference between the first pixel coordinate system and the second pixel coordinate system by calculating a coordinate difference between origins of the first pixel coordinate system and the second pixel coordinate system in a world coordinate system, wherein the positional distance difference is a translation amount of the first pixel coordinate system and the second pixel coordinate system in a horizontal direction;

translating the second grid map based on the positional distance difference to align the first grid map with the second grid map; and generating the navigation grid map by merging the first grid map and the second grid map after aligning the first grid map with the second grid map; and wherein the first grid map is constructed by using a key frame matching based scheme based on the first laser data, and the second grid map is constructed by using the key frame matching based scheme based on the second positioning data and the second laser data.

2. The method of claim 1, wherein the robot has one odometer, and the step of obtaining, by the processor, the movement distance of the robot from the first moment to the second moment using the odometer comprises:

obtaining, by the processor, a first odometer reading of the odometer at the first moment, and a second odometer reading of the odometer at the second moment; and calculating, by the processor, a difference between the first odometer reading and the second odometer reading, and using the difference as the movement distance.

3. The method of claim 1, wherein the second positioning data is generated by adding the movement distance to the first positioning data.

4. The method of claim 1, wherein the robot is a humanoid robot, the first lidar is disposed on a head of the humanoid robot, and the second lidar is disposed on a portion of the humanoid robot lower than the head.

5. A humanoid robot, comprising:

a first lidar;

a second lidar;

an odometer;

a processor electrically coupled to the first lidar, the second lidar and the odometer;

a memory coupled to the processor; and one or more computer programs stored in the memory and executable on the processor;

wherein the first lidar is disposed at a first position of the humanoid robot, the second lidar is disposed at a second position of the humanoid robot, the first position is higher than the second position, and a number of movable objects in a spatial area covered by the second lidar is greater than a number of the movable objects in a spatial area covered by the first lidar; and wherein the one or more computer programs comprise:

instructions for controlling the humanoid robot to move;

instructions for collecting, by the first lidar, first laser data at a first moment, constructing a first grid map corresponding to the first lidar based on the first laser data, and obtaining first positioning data using a Gauss-Newton matching algorithm based on the first laser data, wherein the first positioning data is configured to indicate position information of the first lidar at the first moment;

instructions for collecting, by the second lidar, second laser data at a second moment, wherein the second moment is later than the first moment;

instructions for obtaining a movement distance of the humanoid robot from the first moment to the second moment using the odometer, generating second positioning data based on the first positioning data and the movement distance, and constructing a second grid map corresponding to the second lidar based on the second positioning data and the second laser data, wherein the second positioning data is configured to indicate position information of the second lidar at the second moment;

instructions for obtaining a navigation grid map corresponding to the humanoid robot by fusing the first grid map with the second grid map; and instructions for navigating the humanoid robot according to the navigation grid map;

wherein the humanoid robot has a first odometer corresponding to the first lidar and a second odometer corresponding to the second lidar, and the instructions for obtaining the movement distance of the humanoid robot from the first moment to the second moment using the odometer comprise:

instructions for obtaining a first odometer reading of the first odometer at the first moment, and a second odometer reading of the second odometer at the second moment; and instructions for calculating a difference between the first odometer reading and the second odometer reading, and using the difference as the movement distance;

wherein the navigation grid map comprises: positioning information provided by the first grid map, and obstacle information provided by the first grid map and the second grid map;

wherein the spatial area covered by the first lidar is larger than the spatial area covered by the second lidar, a size of the first grid map is larger than a size of the second grid map, and the instructions for obtaining the navigation grid map corresponding to the humanoid robot by fusing the first grid map with the second grid map comprise:

instructions for constructing a first pixel coordinate system based on a first frame of the first laser data, and constructing a second pixel coordinate system based on a first frame of the second laser data;

instructions for obtaining a positional distance difference between the first pixel coordinate system and the second pixel coordinate system by calculating a coordinate difference between origins of the first pixel coordinate system and the second pixel coordinate system in a world coordinate system, wherein the positional distance difference is a translation amount of the first pixel coordinate system and the second pixel coordinate system in a horizontal direction;

instructions for translating the second grid map based on the positional distance difference to align the first grid map with the second grid map; and instructions for generating the navigation grid map by merging the first grid map and the second grid map after aligning the first grid map with the second grid map; and wherein the first grid map is constructed by using a key frame matching based scheme based on the first laser data, and the second grid map is constructed by using the key frame matching based scheme based on the second positioning data and the second laser data.

6. The humanoid robot of claim 5, wherein the humanoid robot has one odometer, and the instructions for obtaining the movement distance of the humanoid robot from the first moment to the second moment using the odometer comprise:

instructions for obtaining a first odometer reading of the odometer at the first moment, and a second odometer reading of the odometer at the second moment; and instructions for calculating a difference between the first odometer reading and the second odometer reading, and using the difference as the movement distance.

7. The humanoid robot of claim 5, wherein the second positioning data is generated by adding the movement distance to the first positioning data.

8. A non-transitory computer-readable storage medium for storing one or more computer programs executable on a processor of a robot, wherein the robot further comprises a first lidar, a second lidar and an odometer, wherein the first lidar is disposed at a first position of the robot, the second lidar is disposed at a second position of the robot, the first position is higher than the second position, and a number of movable objects in a spatial area covered by the second lidar is greater than a number of the movable objects in a spatial area covered by the first lidar; and wherein the one or more computer programs comprise:
instructions for controlling the robot to move;
instructions for collecting, by the first lidar, first laser data at a first moment, constructing a first grid map corresponding to the first lidar based on the first laser data, and obtaining first positioning data using a Gauss-Newton matching algorithm based on the first laser data, wherein the first positioning data is configured to indicate position information of the first lidar at the first moment;

instructions for collecting, by the second lidar, second laser data at a second moment, wherein the second moment is later than the first moment;

instructions for obtaining a movement distance of the robot from the first moment to the second moment using the odometer, generating second positioning data based on the first positioning data and the movement distance, and constructing a second grid map corresponding to the second lidar based on the second positioning data and the second laser data, wherein the second positioning data is configured to indicate position information of the second lidar at the second moment;

instructions for obtaining a navigation grid map corresponding to the robot by fusing the first grid map with the second grid map; and instructions for navigating the robot according to the navigation grid map;

wherein the robot has a first odometer corresponding to the first lidar and a second odometer corresponding to the second lidar, and the instructions for obtaining the movement distance of the robot from the first moment to the second moment using the odometer comprise:

instructions for obtaining a first odometer reading of the first odometer at the first movment, and a second odometer reading of the second odometer at the second moment; and instructions for calculating a difference between the first odometer reading and the second odometer reading, and using the difference as the movement distance;

wherein the navigation grid map comprises: positioning information provided by the first grid map, and obstacle information provided by the first grid map and the second grid map;

wherein the spatial area covered by the first lidar is larger than the spatial area covered by the second lidar, a size of the first grid map is larger than a size of the second grid map, and the instructions for obtaining the navigation grid map corresponding to the robot by fusing the first grid map with the second grid map comprise:

instructions for constructing a first pixel coordinate system based on a first frame of the first laser data, and constructing a second pixel coordinate system based on a first frame of the second laser data;

instructions for obtaining a positional distance difference between the first pixel coordinate system and the second pixel coordinate system by calculating a coordinate difference between origins of the first pixel coordinate system and the second pixel coordinate system in a world coordinate system, wherein the positional distance difference is a translation amount of the first pixel coordinate system and the second pixel coordinate system in a horizontal direction;

instructions for translating the second grid map based on the positional distance difference to align the first grid map with the second grid map; and instructions for generating the navigation grid map by merging the first grid map and the second grid map after aligning the first grid map with the second grid map; and wherein the first grid map is constructed by using a key frame matching based scheme based on the first laser data, and the second grid map is constructed by using the key frame matching based scheme based on the second positioning data and the second laser data.

9. The non-transitory computer-readable storage medium of claim 8, wherein the robot has one odometer, and the instructions for obtaining the movement distance of the robot from the first moment to the second moment using the odometer comprise:

instructions for obtaining a first odometer reading of the odometer at the first moment, and a second odometer reading of the odometer at the second moment; and instructions for calculating a difference between the first odometer reading and the second odometer reading, and using the difference as the movement distance.

* * * * *